(12) United States Patent
Amano

(10) Patent No.: US 6,805,476 B2
(45) Date of Patent: Oct. 19, 2004

(54) LED-TYPE VEHICULAR LAMP HAVING UNIFORM BRIGHTNESS

(75) Inventor: Yasuyuki Amano, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 101 days.

(21) Appl. No.: 10/244,606

(22) Filed: Sep. 17, 2002

(65) Prior Publication Data

US 2003/0169600 A1 Sep. 11, 2003

(30) Foreign Application Priority Data

Sep. 20, 2001 (JP) .................................... P.2001-286585

(51) Int. Cl.[7] .............................................. F21V 21/00
(52) U.S. Cl. ..................... 362/545; 362/518; 362/520; 362/245; 362/308; 362/328
(58) Field of Search ................................ 362/543–545, 362/520–522, 242–245, 516–518, 247, 308, 328, 343, 800

(56) References Cited

U.S. PATENT DOCUMENTS

| | | | |
|---|---|---|---|
| 4,646,207 A | 2/1987 | Levin et al. | |
| 4,929,866 A | * 5/1990 | Murata et al. | 362/545 |
| 5,054,885 A | 10/1991 | Melby | |
| 5,453,855 A | 9/1995 | Nakamura et al. | |
| 6,280,480 B1 | * 8/2001 | Tuttle et al. | 362/518 |
| 6,637,923 B2 | * 10/2003 | Amano | 362/545 |
| 6,672,746 B2 | * 1/2004 | Amano | 362/545 |

FOREIGN PATENT DOCUMENTS

| | | |
|---|---|---|
| DE | 19638081 A1 | 3/1998 |
| JP | 11-306810 | 11/1999 |

* cited by examiner

Primary Examiner—Stephen F Husar
(74) Attorney, Agent, or Firm—Sughrue Mion, PLLC

(57) ABSTRACT

A vehicular lamp radiating light emitted by LED light sources through indirect illumination and having uniform brightness. Light from LED light sources is directed upward into parallel beams by Fresnel lenses. The parallel beams are reflected in a frontward direction. A reflector is divided into sub reflectors that differ in height and angle of forward inclination The distance between each LED light source and a corresponding Fresnel lens increases in proportion to a decrease in height of a corresponding sub reflectors, and the intensity of the luminous flux impinging on each Fresnel lens decreases in proportion to a decrease in height of a corresponding sub reflectors. The intensity of luminous flux impinging on each sub reflectors decreases in proportion to a decrease in projected area in a forward direction of the lamp. The sub reflectors have uniform luminance and the entire reflecting surface appears uniform in brightness.

18 Claims, 10 Drawing Sheets

LED-TYPE VEHICULAR LAMP HAVING UNIFORM BRIGHTNESS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a vehicular lamp employing a plurality of LED light sources and, more particularly, to a vehicular lamp which radiates light using an indirect illumination technique.

Many vehicular lamps that have been employed in recent years are equipped with LED light sources. For example, Japanese Patent Application Laid-Open No. 11-306810 discloses a lamp having LED light sources disposed so as to be invisible from the front of the lamp, thus providing a soft lighting effect due to the use of an indirect illumination technique. Further, as disclosed in German Patent Application Laid-Open No. 19638081, some vehicular lamps of an indirect illumination type are equipped with Fresnel lenses as well as LED light sources.

FIG. 9 is a front view of a vehicular lamp 100 of such a type. As shown in the drawing, in the vehicular lamp 100 light emitted by a plurality of LED light sources 102 disposed facing upward is formed into parallel light beams by a plurality of Fresnel lenses 104 disposed above the LED light sources 102, and a reflector 106 reflects the parallel light beams from the Fresnel lenses 104 in the directly forward direction of the lamp. The light emitted by the light sources thus can be effectively utilized by combining the LED light sources 102 with the Fresnel lenses 104.

The reflector 106 of the vehicular lamp 100 is divided into smaller sub reflectors 108 disposed in the areas where the parallel light beams from the Fresnel lenses 104 impinge, and the sub reflectors 108 are made different in height so as to conform to the contour of the lamp. In order to ensure that the parallel light beams from each of the Fresnel lenses 104 impinges on a reflecting surface 108a of a corresponding one of the sub reflectors 108, the sub reflectors 108 are designed such that the angle of inclination in the directly forward direction of the lamp increases as the height of the sub reflectors 108 decreases.

However, the aforementioned conventional vehicular lamp 100 lacks a desired visual impressiveness when lighted.

That is, as shown in FIG. 10, the vehicular lamp 100 is designed such that the sub reflectors 108 and the Fresnel lenses 104 are all equal in lateral width (P1'=P2'=P3'=P4'=P5'). The LED light sources 102 are all spaced from corresponding ones of the Fresnel lenses 104 by an equal distance H'. Thus, the luminous fluxes impinging on each of the Fresnel lenses 104 from corresponding ones of the LED light sources 102 have equal intensities (F1'=F2'=F3'=F4'=F5'). On the other hand, since the sub reflectors 108 differ in projected area in the forward direction of the lamp (A1'<A2'<A3'<A4'<A5'), the reflecting surfaces 108a of the sub reflectors 108 increase in luminance and appear brighter as the aforementioned projected areas become smaller in size.

More specifically, the reflecting surface 108a of each of the sub reflectors 108 is vertically divided into a plurality of segments so as to form the sub reflector in a stepped manner. Each segment contains a reflecting element 108s for diffusively reflecting the parallel light flux from a corresponding one of the Fresnel lenses 104 in the directly forward direction of the lamp and a vertically extending step portion 108r. Hence, if the reflector 106 is observed from the front of the lamp when the lamp is lighted, central portions of the reflecting elements 108s appear bright as glitter portions B'.

The glitter portions B' appear substantially equally bright among the reflecting elements 108s and among the sub reflectors 108. However, the vertical distance among the reflecting elements 108s constituting each of the sub reflectors 108 decreases in proportion to a decrease in the aforementioned projected area. Hence, if the sub reflectors 108 are observed one by one, they increase in luminance and look brighter in proportion to the decrease in the aforementioned projected area.

Hence, it is impossible to make the entire reflecting surface of the reflector 106 look substantially homogeneous in brightness, which adversely affects the appearance of the lamp when the lamp is lighted.

BRIEF SUMMARY OF THE INVENTION

The present invention has been made in consideration of such circumstances. It is an object of the present invention to provide a vehicular lamp that radiates light emitted from a plurality of LED light sources through indirect illumination and which has an improved appearance when lighted.

The present invention achieves the above and other objects with a vehicular lamp having a controlled positional relationship between each of LED light sources and corresponding ones of the lenses.

More specifically, a vehicular lamp according to the present invention comprises a plurality of LED light sources, a plurality of lenses for forming parallel light beams from the light from the LED light sources, a reflector for reflecting the parallel light beams from the lenses in the directly forward direction of the lamp, and a translucent cover disposed in front of the reflector with respect to the lamp. The lenses are disposed such that the parallel light beams travel in the same direction, the reflector is divided into sub reflectors according to areas on which the parallel light beams from the lenses impinge, the sub reflectors differ in length with respect to the direction of radiation of the parallel light beams and are designed such that the angle of inclination in the directly forward direction of the lamp increases in proportion to the decrease in the length of the sub reflectors in the direction of radiation of the parallel light beams, and the distance between each of the LED light sources and the corresponding one of the lenses increases in proportion to the decrease in the length of the sub reflector in the direction of radiation of the parallel light beams.

The lenses are not specifically limited in construction as long as they can form parallel light beams from the light emitted by the LED light sources. For instance, single spherical lenses, combinational lenses, Fresnel lenses, and the like can be adopted.

Also, the directions of the parallel light beams are not specifically limited as long as they intersect the longitudinal direction of the lamp. For instance, the parallel light beams can be directed upward or transversely while being perpendicular to the longitudinal direction of the lamp.

The reflector may be integrally formed of a plurality of sub reflectors or be formed of separated sub reflectors.

The sub reflectors are not specifically limited in shape, size, or the like as long as they differ in length with respect to the direction of radiation of the parallel light beams and as long as they are designed such that the angle of inclination in the directly forward direction of the lamp increases in proportion to the decrease in the length in the direction of radiation of the parallel light beams. It is not absolutely required that all the sub reflectors are different in length with respect to the direction of radiation of the parallel light beams. It is appropriate that at least two of the sub reflectors be different in length with respect to the direction of radiation of the parallel light beams.

As is apparent from the description above, the vehicular lamp according to the present invention is designed such that the lenses for forming parallel light beams from light from the LED light sources are disposed so as to direct the parallel light beams in the same direction, the reflector for reflecting the parallel light beams from the lenses in the directly forward direction of the lamp is divided into sub reflectors according to the areas impinged by the parallel light beams from the lenses, the sub reflectors differ in length with respect to the direction of radiation of the parallel light beams, the sub reflectors are formed such that the angle of inclination increases in the directly forward direction of the lamp in proportion to the decrease in the length in the direction of radiation of the parallel light beams, and the sub reflectors are formed such that the distance between each of the LED light sources and the corresponding one of the lenses increases in proportion to the decrease in the length of the sub reflector in the direction of radiation of the parallel light beams. With this construction, the following effects can be achieved.

That is, since the sub reflectors differ in length with respect to the direction of radiation of the parallel light beams and are designed such that the angle of inclination toward the region in front of the lamp increases in proportion to a decrease in the length, the sub reflectors differ in projected area in the direction extending forward of the lamp. Hence, if each of the LED light sources is equally distant from a corresponding one of the lenses, the sub reflectors increase in luminance and look brighter in proportion to the decrease in the aforementioned projected area.

On the other hand, according to the present invention, the sub reflectors are designed such that the distance between each of the LED light sources and a corresponding one of the lenses increases in proportion to the decrease in the length of a corresponding one of sub reflectors in the direction of radiation of the parallel light beams, whereby the sub reflectors can be designed such that the luminous flux impinging on each of the lenses from a corresponding one of the LED light sources decreases in proportion to the decrease in length of a corresponding one of the sub reflectors in the direction of radiation of the parallel light beams. Hence, the sub reflectors exhibit the same luminance when the lamp is lighted, and the entire reflecting surface of the reflector can be made to appear substantially homogeneous in brightness.

Accordingly, the present invention makes it possible to improve the appearance of a vehicular lamp which radiates light from a plurality of LED light sources through indirect illumination when the lamp is lighted.

The sub reflectors and the lenses may be equal or different in width in the direction perpendicular to the longitudinal direction of the lamp. In the former case, light emitted from an LED light source spaced from the corresponding lens by a relatively great distance partially fails to impinge on that lens and is wasted. In the latter case, however, if the sub reflectors and the corresponding lenses are designed such that the width in the direction perpendicular to the longitudinal direction of the lamp increases in proportion to the decrease in the length of the sub reflector in the direction of radiation of the parallel light beams, the sub reflectors appear uniform in luminance while substantially all the light emitted from each of the LED light sources is guaranteed to impinge on one of the lenses without waste.

The reflecting surface of each of the sub reflectors may be constructed of a single curved surface or of a plurality of reflecting elements. In the latter case, if the reflecting surface of each of the sub reflectors is divided into a plurality of segments with respect to the direction of radiation of the parallel light beams and is formed in a stepped manner with one of the reflecting elements and a corresponding one of step portions being provided in each of the segments, the available light can be efficiently radiated in the directly forward direction of the lamp. It is also appropriate for the reflecting surface of each of the sub reflectors to be divided into a plurality of segments with respect to the direction perpendicular to the longitudinal direction of the lamp.

If each of the reflecting elements is constructed of a curved surface for diffusively reflecting parallel light beams from a corresponding one of the lenses vertically and laterally, the lamp will exhibit the desired light distribution performance even in the case where the translucent cover is formed as a transparent type.

Alternatively, it is also possible to construct each of the reflecting elements as a flat surface so that the parallel light beams from the lenses are reflected as they are, that is, parallel in the directly forward direction of the lamp, while forming diffusion lens elements on the translucent cover or the like to diffuse the light beams vertically and laterally. It is also possible to construct each of the reflecting elements as a surface curved in only one direction so that the parallel light beams from the lenses are diffusively reflected in only one direction, while forming diffusion lens elements on the translucent cover or the like to diffuse the light beams in the direction perpendicular to the aforementioned one direction.

DETAILED DESCRIPTION OF THE INVENTION

Preferred embodiments of the present invention will be described hereinafter with reference to the drawings.

Figure 1:
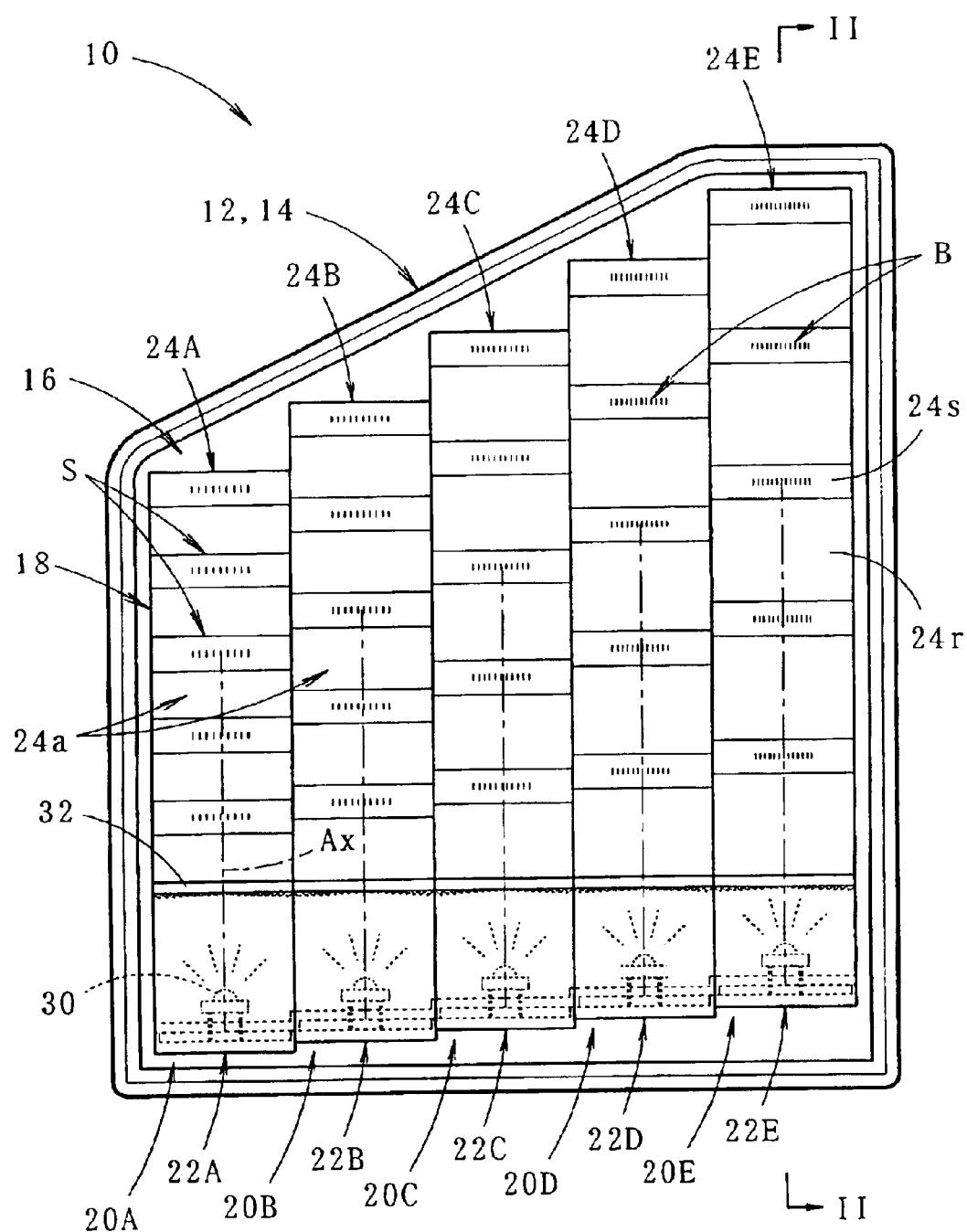
FIG. 1 is a front view of a vehicular lamp constructed according to a preferred embodiment of the present invention.
Figure 2:
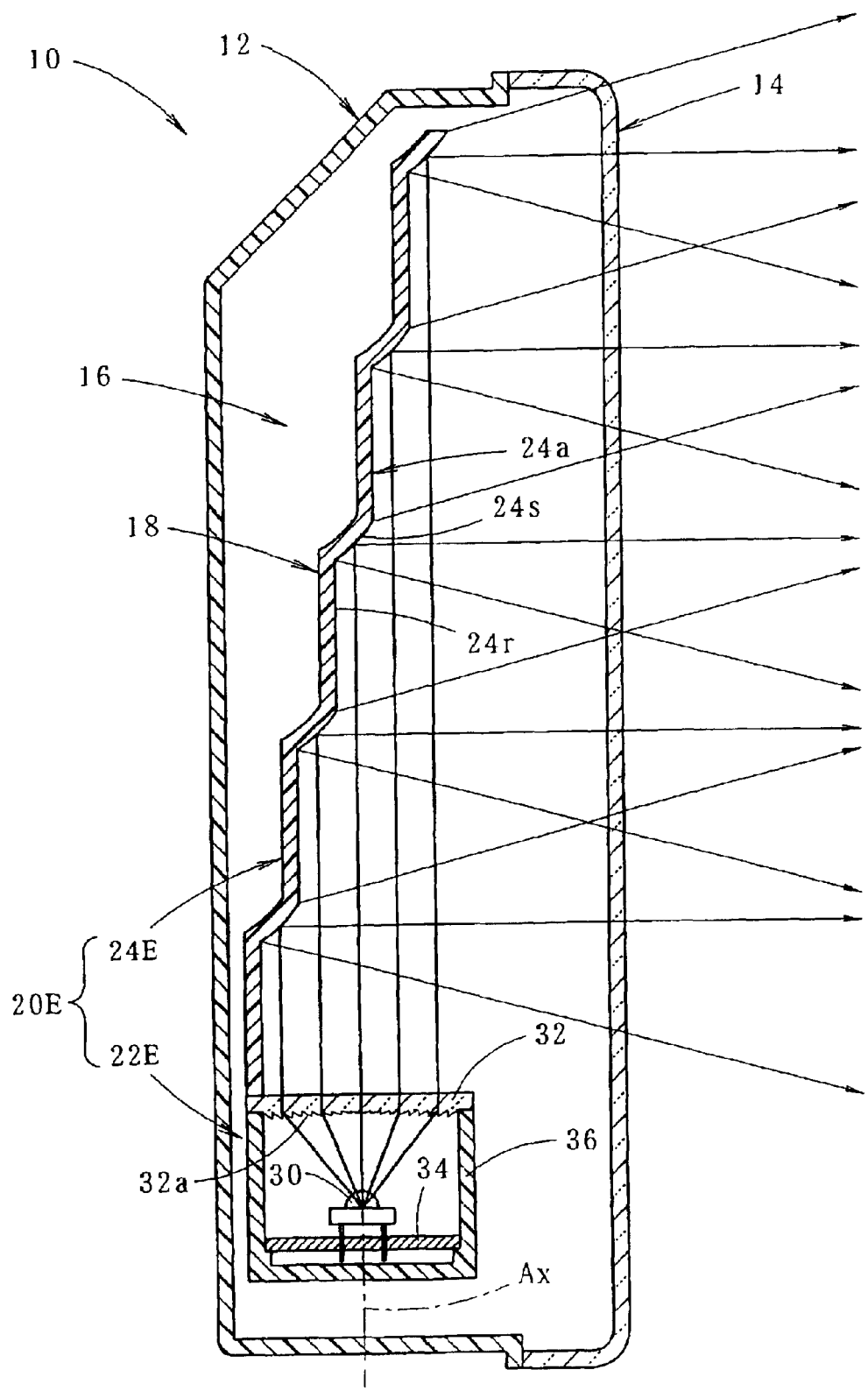
FIG. 2 is a cross-sectional view taken along a line II—II in FIG. 1.

FIG. 1 is a front view of a vehicular lamp constructed according to the present invention. FIG. 2 is a cross-sectional view taken along a line II—II in FIG. 1.

As shown in these drawings, a vehicular lamp 10 according to the present embodiment is a tail-and-stop lamp mounted in a left corner portion at the rear end of an automotive vehicle. The vehicular lamp 10 includes a lamp unit 16 accommodated in a lighting chamber composed of a lamp body 12 and a transparent, translucent cover 14.

The lamp unit 16 is composed of a plurality (five) of light source units 22A, 22B, 22C, 22D and 22E and a reflector 18 that reflects light beams from the light source units 22A to 22E forward with respect to the lamp (rearward with respect to the vehicle; the same directional reference is employed in the discussion below). The reflector 18 is divided into sub reflectors 24A, 24B, 24C, 24D and 24E, which correspond to the light source units 22A, 22B, 22C, 22D and 22E, respectively. The light source units 22A to 22E and the sub reflectors 22A to 22E constitute five LED units 20A, 20B, 20C, 20D and 20E, respectively.

The light source units 22A to 22E, which are all in the shape of a rectangular parallelepiped, are mounted affixed to one another with their upper end faces flush with one another. The light source units 22A to 22E are mutually equal in lateral width and depth but differ in height. That is, the height decreases stepwise from the leftmost light source unit 22A to the rightmost light source unit 22E.

The sub reflectors 24A to 24E are formed such that their height increases stepwise in the direction from the leftmost sub reflector 24A to the rightmost sub reflector 24E. More specifically, each of the sub reflectors 24A to 24E has a reflecting surface 24a divided into a plurality of segments (five segments) S that are vertically arranged at equal intervals. The height of the segments S increases stepwise from the leftmost sub reflector 24A to the rightmost sub reflector 24E. Hence, the upper end edge of the reflector 18 follows the shape of the translucent cover 14, whose upper end is formed so as to gradually decrease in height in the direction from the right end to the left end of the cover.

Figure 3:
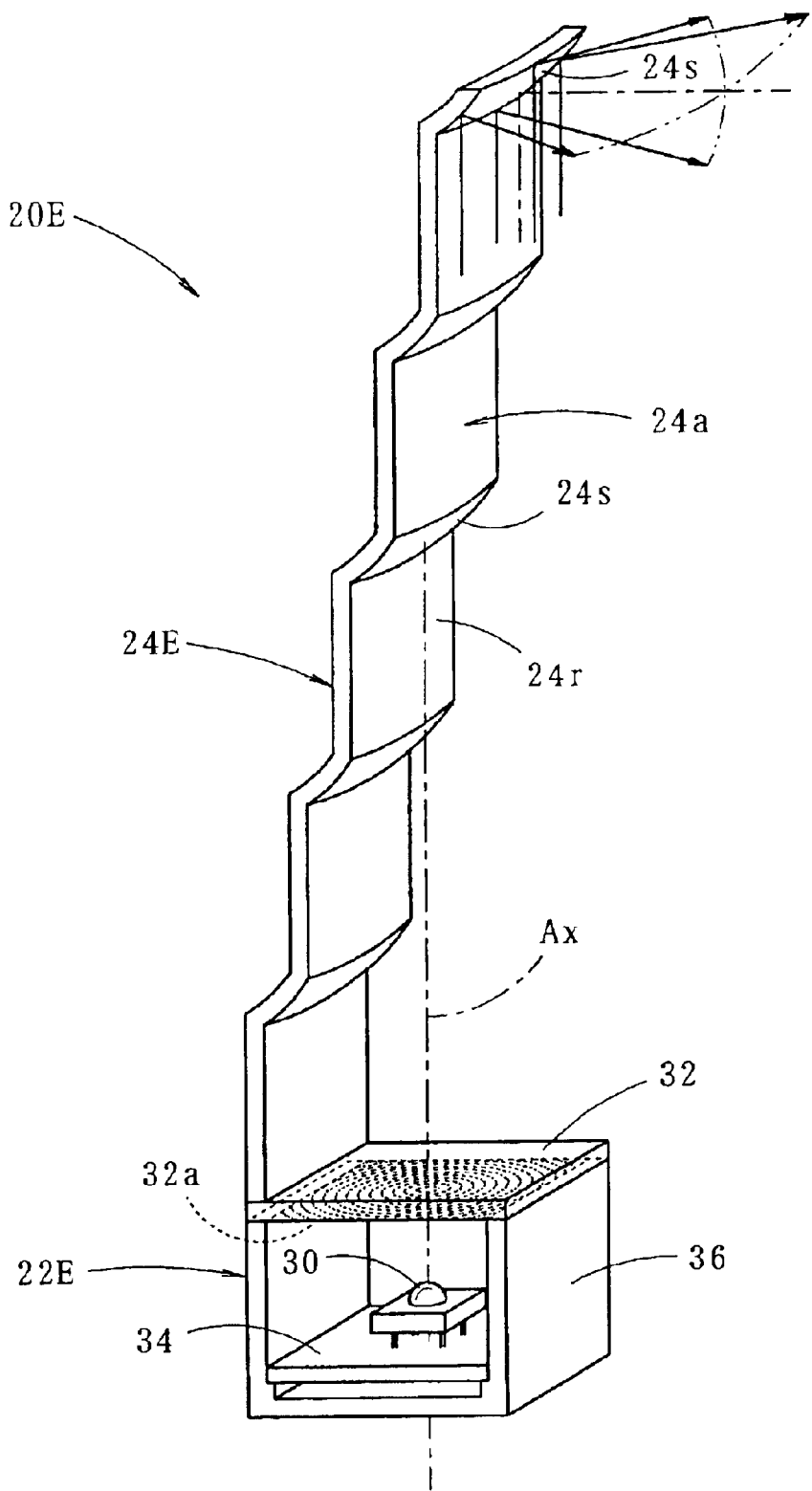
FIG. 3 is a perspective cutout view of the rightmost one of five LED units constituting the aforementioned lamp unit.

FIG. 3 is a perspective cutout view of the rightmost one of the five LED units 20A to 20E constituting the lamp unit 16, that is, the LED unit 20E.

As shown in the drawing, the light source unit 22E of the LED unit 20E is composed of a corresponding one of the LED light sources 30 disposed facing upward, a corresponding one of the Fresnel lenses 32 forming a parallel light beam from the light emitted from the LED light source 30, a printed circuit board 34 supporting the LED light source 30, and a housing 36 supporting the printed circuit board 34 and the Fresnel lens 32.

Each Fresnel lens 32 has an optical axis Ax vertically extending through a central position of the LED light source 30. A Fresnel lensing portion 32a is formed on a lower surface of the Fresnel lens 32. The printed circuit board 34 and the housing 36 extend laterally over the entire width of the lamp unit 16.

The sub reflector 24E of the LED unit 20E extends from a rear end portion of the light source unit 22E diagonally upward and forward. The sub reflector 24E reflects the parallel light beam radiated upward from the Fresnel lens 32 substantially at a right angle and forward with respect to the lamp.

The reflecting surface 24a of the sub reflector 24E is formed in a stepped manner with a reflecting element 24s and step portion 24r being formed in each segment S. The reflecting surface 24a is designed such that each of the reflecting elements 24s diffusively reflects the parallel light beam from the Fresnel lens 32 forward with respect to the lamp. Each of the step portions 24r is formed as a vertical plane so that no portion of the parallel light beam from the corresponding Fresnel lens 32 is incident thereon. Each of the reflecting elements 24s is constructed of a generally spherically curved surface so as to reflect the parallel light beam from the corresponding Fresnel lens 32 in a diffused manner both vertically and laterally at predetermined diffusion angles with respect to the directly forward direction of the lamp. The reflecting elements 24s are equal in vertical diffusion angle and in lateral diffusion angle.

Figure 4:
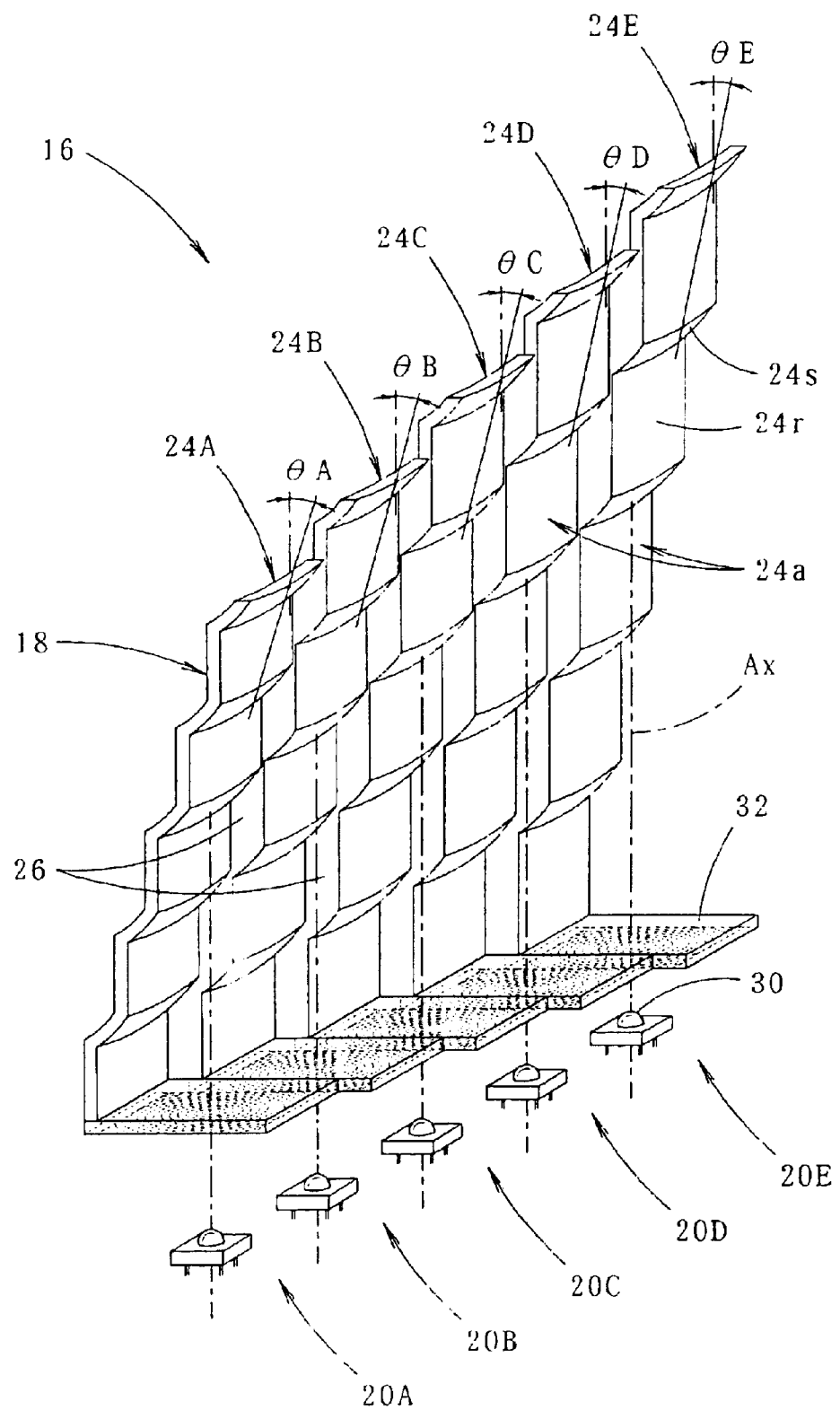
FIG. 4 is a partially simplified perspective view of the aforementioned lamp unit.

FIG. 4 is a partially simplified perspective view of the lamp unit 16.

As shown in FIG. 4, the sub reflectors 24A to 24E of the LED units 20A to 20E are designed such that their angle of forward inclination increases in proportion to the decrease in the height of the sub reflector ($\theta A > \theta B > \theta C > \theta D > \theta E$), so as to ensure that all portions of the parallel light beams from each of the Fresnel lenses 32 are reflected forward with respect to the lamp.

The LED units 20A to 20E are disposed in a stepped manner such that they are displaced rearward in a stepwise manner with respect to the front of the lamp from the right end to the left end of the lamp unit 16, whereby the lamp unit 16 generally follows the contour of the translucent cover 14. Adjacent ones of the sub reflectors 24A to 24E are connected via vertical boundary walls 26 extending in a longitudinal direction of the lamp, whereby the reflector 18 is integrally formed.

Figure 5:
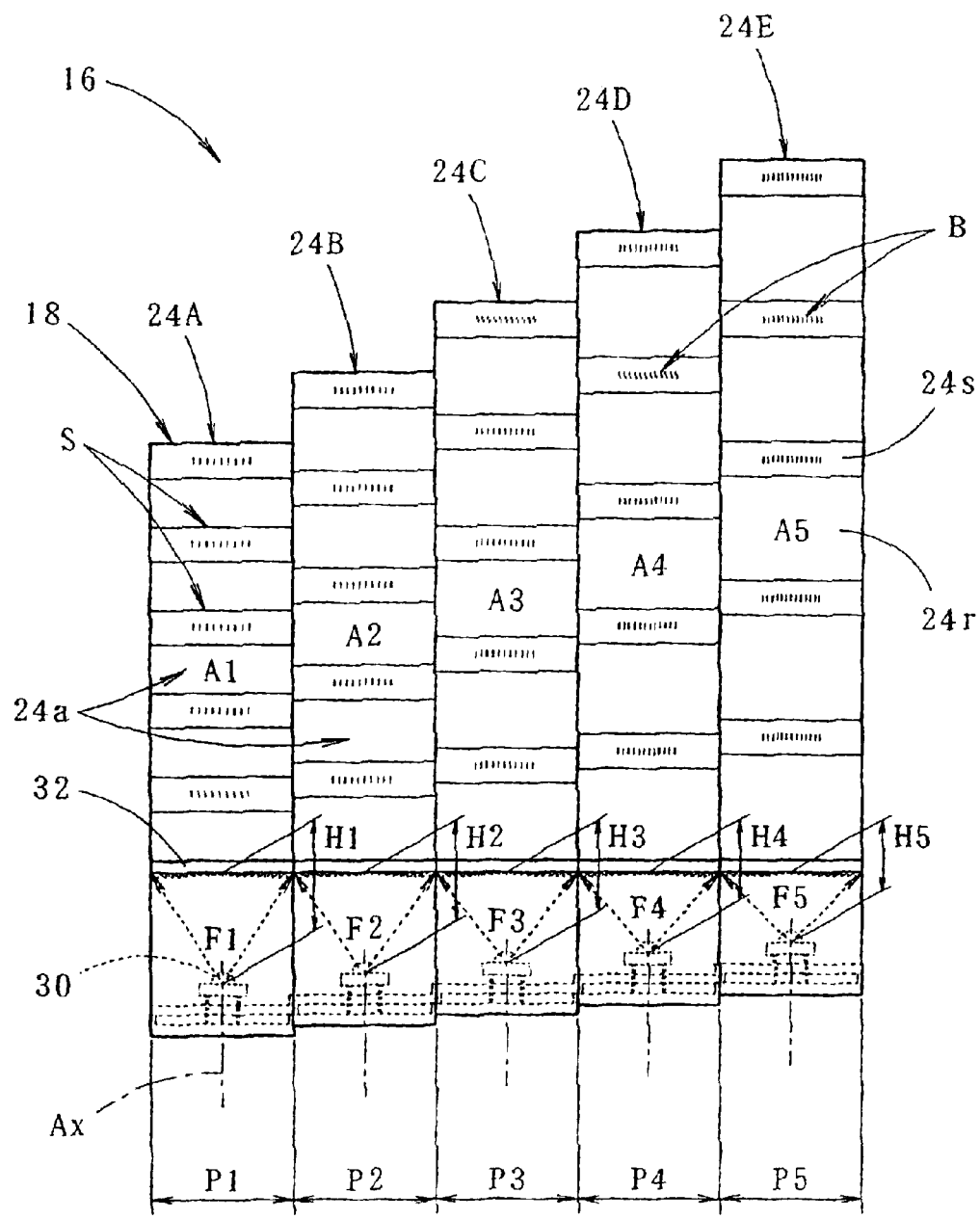
FIG. 5 is a front view of the aforementioned lamp unit.

FIG. 5 is a front view of just the lamp unit 16.

As shown in the drawing, the LED units 20A to 20E (and thus the sub reflectors 24A to 24E and the Fresnel lenses 32) are all equal in lateral width (P1=P2=P3=P4=P5). The distance between each of the LED light sources 30 and the corresponding one of the Fresnel lenses 32 decreases stepwise from the leftmost LED unit 20A to the rightmost LED unit 20E (H1>H2>H3>H4>H5). The focal distance of each of the Fresnel lenses 32 is equal to the distance H1, H2, H3, H4 or H5 between that Fresnel lens 32 and the corresponding one of the LED light sources 30.

The sub reflectors 24A to 24E are designed such that the projected area of the sub reflectors in the direction forward of the lamp increases stepwise in the direction from the leftmost sub reflector 24A to the rightmost sub reflector 24E (A1<A2<A3<A4<A5). The intensity of the luminous flux impinging on each of the Fresnel lenses 32 from a corresponding one of the LED light sources 30 increases stepwise from the leftmost light source unit 22A to the rightmost light source unit 22E (F1<F2<F3<F4<F5). Therefore, if the reflecting surface of the reflector 18 is observed from a region in front of the lamp when the lamp is lighted, the sub reflectors 24A to 24E appear substantially equal in brightness.

More specifically, a central portion of each of the reflecting elements 106s appears bright as a corresponding glitter portion B, whose brightness is proportional to the intensity of the luminous flux impinging on each of the Fresnel lenses 32 from a corresponding one of the LED light sources 30. Hence, the glitter portions B increase in brightness in a stepwise manner from the leftmost sub reflector 24A to the rightmost sub reflector 24E On the other hand, the height of the reflecting elements 106s constituting each of the sub reflectors 24A to 24E decreases in proportion to the decrease in the aforementioned projected area, thus increasing stepwise from the leftmost sub reflector 24A to the rightmost sub reflector 24E. Accordingly, when the sub reflectors 24A to 24E are observed one by one, they all look substantially equal in brightness.

As described above in detail, the vehicular lamp 10 according to the present embodiment is designed such that the reflector 18 for reflecting the parallel light beams emitted upward from the light source units 22A to 22E forward with respect to the directly forward direction of the lamp is divided into the sub reflectors 24A to 24E according to the areas which the parallel light beams impinge, the sub reflectors 24A to 24E differ in height, and the angle of inclination toward the front of the lamp increases in proportion to the decrease in the height of the sub reflectors ($\theta A > \theta B > \theta C > \theta D > \theta E$). The distance between the LED light source 30 and the Fresnel lens 32 of each of the light source units 22A to 22E increases in proportion to the decrease in height of the corresponding one of the sub reflectors ($H1 > H2 > H3 > H4 > H5$). With this construction, the following operational effects can be achieved.

That is, the sub reflectors 24A to 24E differ in height and are designed such that the angle of inclination toward the front of the lamp increases in proportion to the decrease in their height. Thus, the sub reflectors 24A differ in their projected area in the direction extending forward of the lamp ($A1 < A2 < A3 < A4 < A5$). Hence, if the distance between each of the LED light sources 30 and the corresponding one of the Fresnel lenses 32 were the same, the sub reflectors 24A to 24E would stepwise increase in luminance in proportion to the decrease in the aforementioned projected area.

On the other hand, in the case of the present embodiment, the sub reflectors are designed such that the distance between each of the LED light sources 30 and the corresponding one of the Fresnel lenses 32 increases in proportion to the decrease in height ($H1 > H2 > H3 > H4 > H5$) of the sub reflectors, as a result of which the intensity of the luminous flux impinging on each of the Fresnel lenses 32 from the corresponding one of the LED light sources 30 decreases in proportion to the decrease in the height ($F1 < F2 < F3 < F4 < F5$) of the sub reflectors. Thus, the sub reflectors 24A to 24E can be made uniform in luminance, whereby the entire reflecting surface of the reflector 18 appears substantially uniform in brightness.

Accordingly, the present invention makes it possible to improve the appearance of a vehicular lamp designed to radiate light from a plurality of LED light sources through indirect illumination.

Further, according to the present embodiment, the reflecting surface 24a of each of the sub reflectors 24A to 24E is vertically divided into the plurality of segments S, each of which contains a corresponding one of the reflecting elements 24s and a corresponding one of the step portions 24r, whereby the reflecting surface 24a is formed in a stepped manner. This arrangement results in the light beams being efficiently radiated toward the region in front of the lamp.

Since each of the reflecting elements 24s is constructed of a curved surface that diffusively reflects the parallel light beam from a corresponding one of the Fresnel lenses 32 both vertically and laterally, the lamp provides the desired light distribution performance, even if the translucent cover 14 is transparent. In addition, the following operational effect can be achieved.

That is, as shown in FIG. 1, when the lighted lamp unit 16 is observed from a point in front of the lamp, the reflecting surfaces 24a of the sub reflectors 24A to 24E appear randomly bright. Each of the glitter portions B is located at the center of a corresponding one of the reflecting elements 24s. If the observation point is vertically or laterally shifted from a position directly in front of the lamp, each of the glitter portions B vertically or laterally shifts within a corresponding one of the reflecting elements 24s as well. However, the reflecting elements 24s have an equal diffusion angle. Therefore, all the reflecting elements 24s appear bright, until the observation point is moved to a position where the diffusion angle is exceeded, whereupon all the reflecting elements 24s become dark simultaneously. Hence, the overall appearance of the lamp unit 16 is improved.

Instead of constructing the reflecting elements 24s of generally spherical curved surfaces as in the embodiment described above, it is also possible to construct the reflecting elements 24s as flat surfaces so that the parallel light beams from the Fresnel lenses 32 are reflected toward the front of the lamp as they are, that is, while retaining the parallelism of the beams, in which case diffusion lens elements are formed on the translucent cover 14 (or on an additionally provided inner lens) so that the output light beams are vertically and laterally diffused. Alternatively, it is also possible to construct each of the reflecting elements 24s a surface having curvature in only one direction so that parallel light beams from the Fresnel lenses 32 are diffusively reflected only in one direction toward the front of the lamp, while forming diffusion lens elements on the translucent cover 14 or the like so that the light beams are diffused in the direction perpendicular to the aforementioned one direction.

Further modified embodiments of the present invention will now be described.

Figure 6:
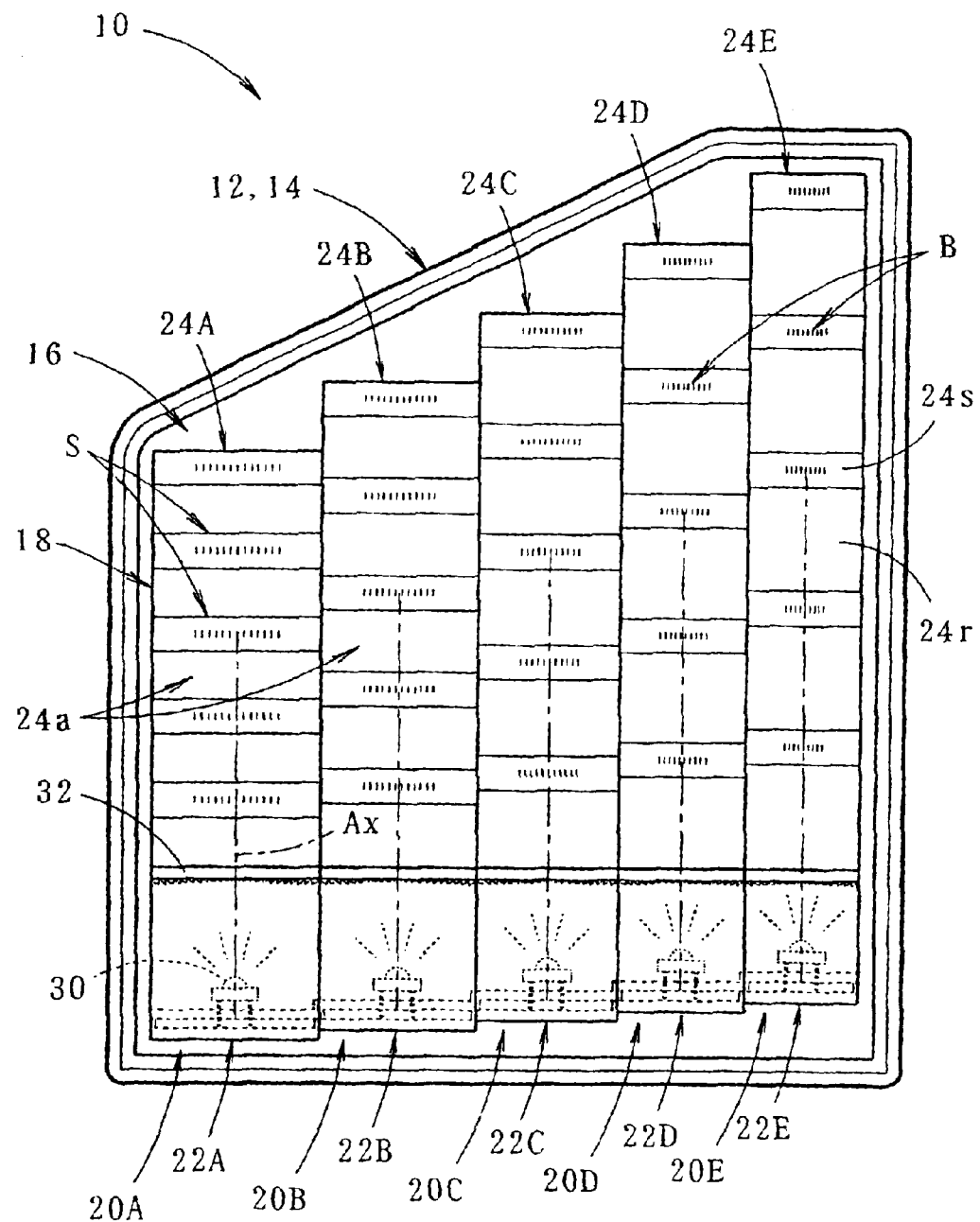
FIG. 6 is a view similar to FIG. 1 showing an alternative embodiment.
Figure 7:
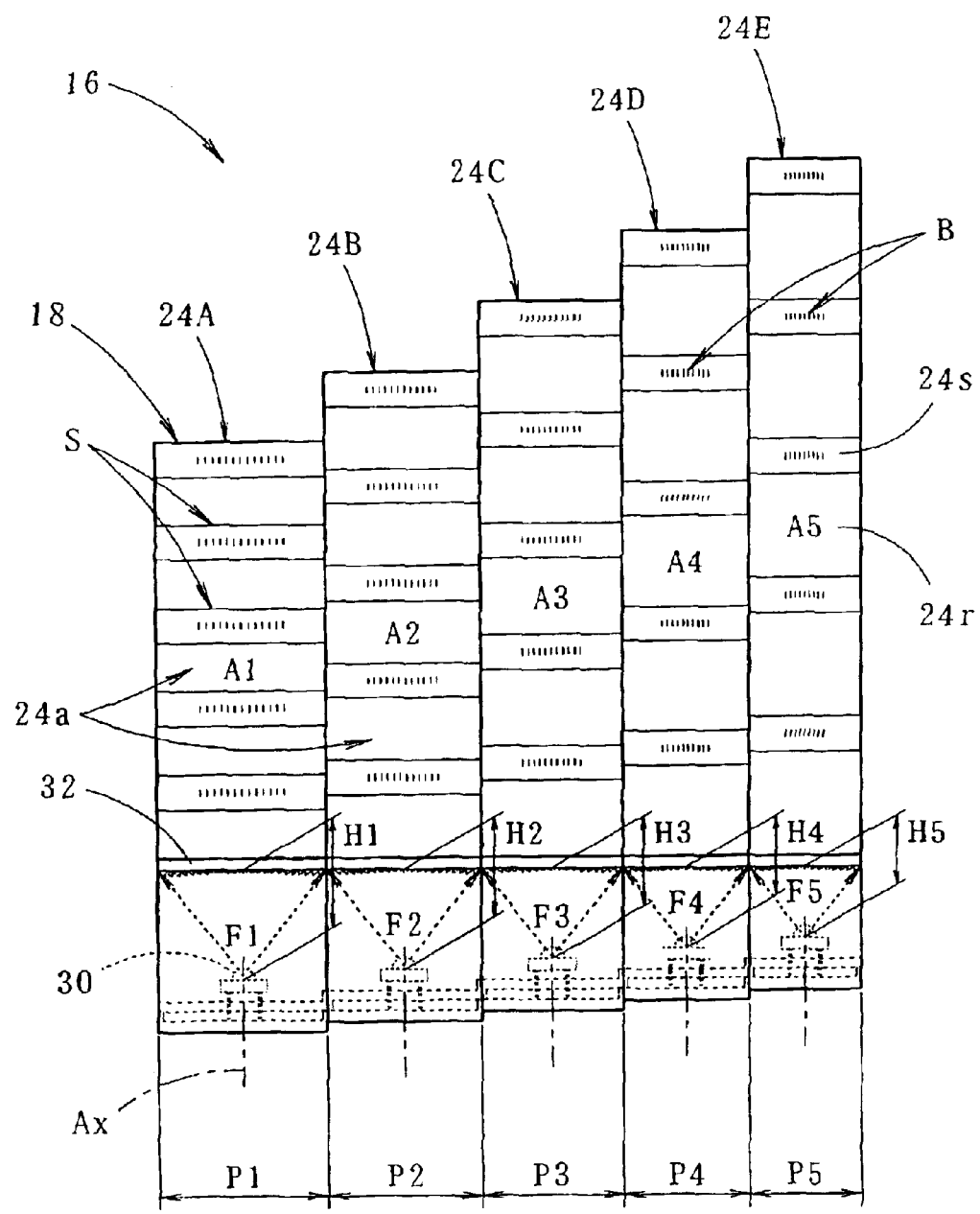
FIG. 7 is a view similar to FIG. 5 showing the alternative embodiment of FIG. 5.

In the aforementioned embodiment, the LED units 20A to 20E are equal in lateral width ($P1=P2=P3=P4=P5$). However, according to the embodiment shown in FIGS. 6 and 7, the LED units 20A to 20E are designed such that the lateral width decreases stepwise from the leftmost LED unit 20A to the rightmost LED unit 20E ($P1 > P2 > P3 > P4 > P5$).

By adopting such a construction, the Fresnel lenses 32 can be equalized in aperture angle, whereby it becomes possible to ensure that the light produced by each of the LED light sources 30 impinges on a corresponding one of the Fresnel lenses 32 without waste, and to equalize in intensity the luminous flux impinging on each of the Fresnel lenses 32 among the light source units 22A to 22E ($F1=F2=F3=F4=F5$). Further, if the light source units 22A to 22E increase or decrease in lateral width, the sub reflectors 24A to 24E increase or decrease in lateral width as well. Therefore, if a certain one of the LED units has an increased (reduced) intensity of the luminous flux impinging on a corresponding one of the Fresnel lenses 32, the projected area of the corresponding one of the sub reflectors in the direction forward of the lamp increases (decreases) as well. Hence, the sub reflectors 24A to 24E can be made uniform in luminance.

Figure 8:
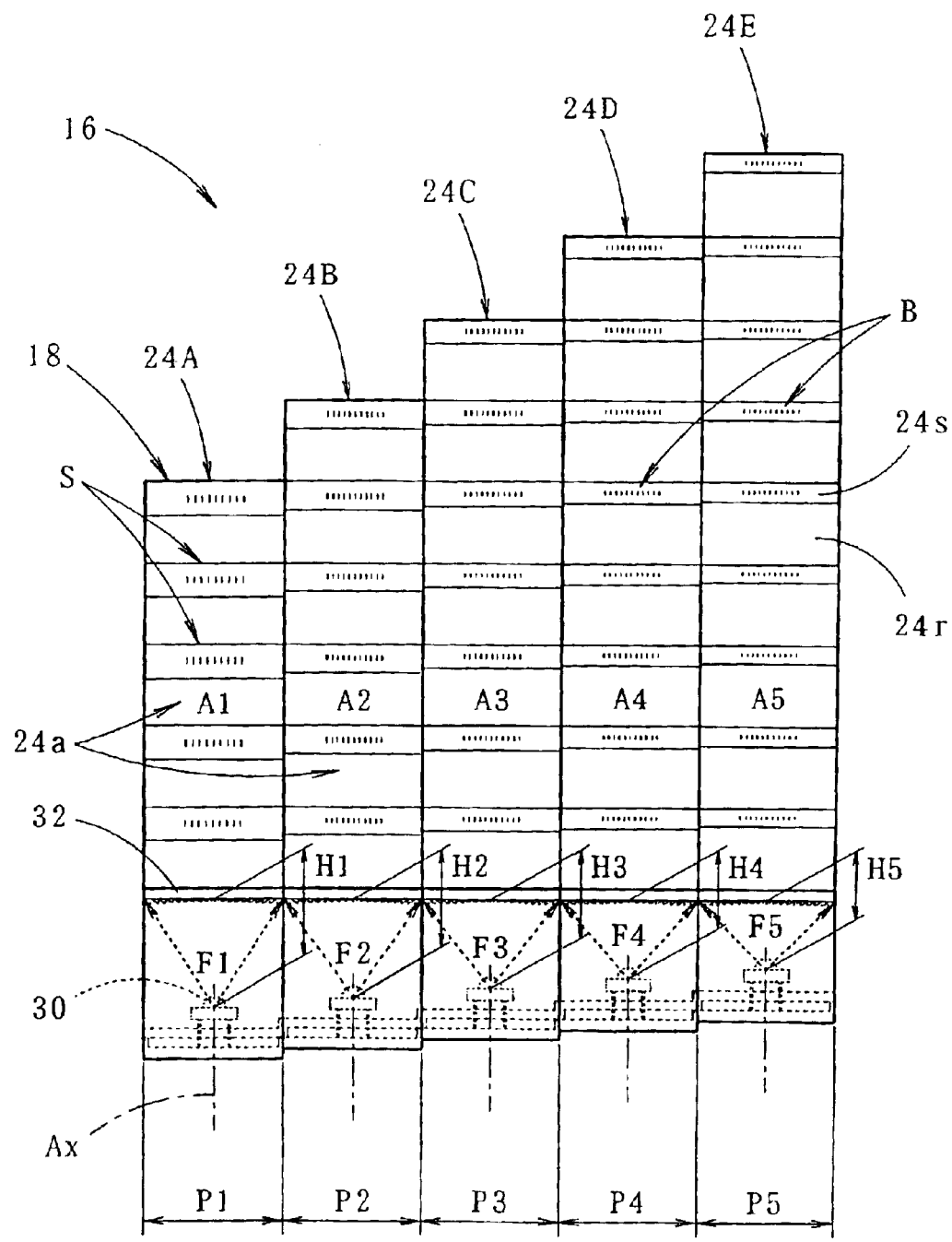
FIG. 8 is a view similar to FIG. 5 showing another alternative embodiment of the invention.
Figure 9:
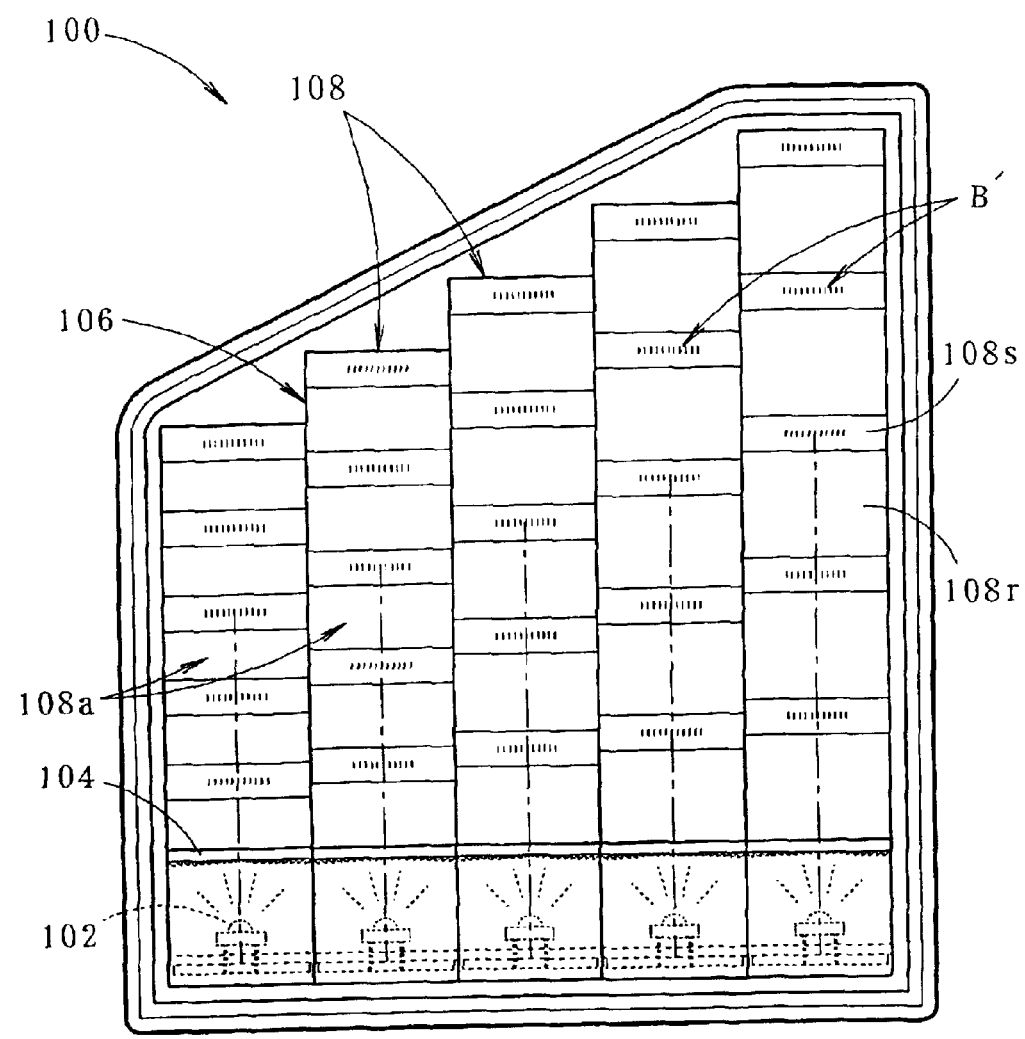
FIG. 9 is a view similar to FIG. 1 showing a conventional lamp.
Figure 10:
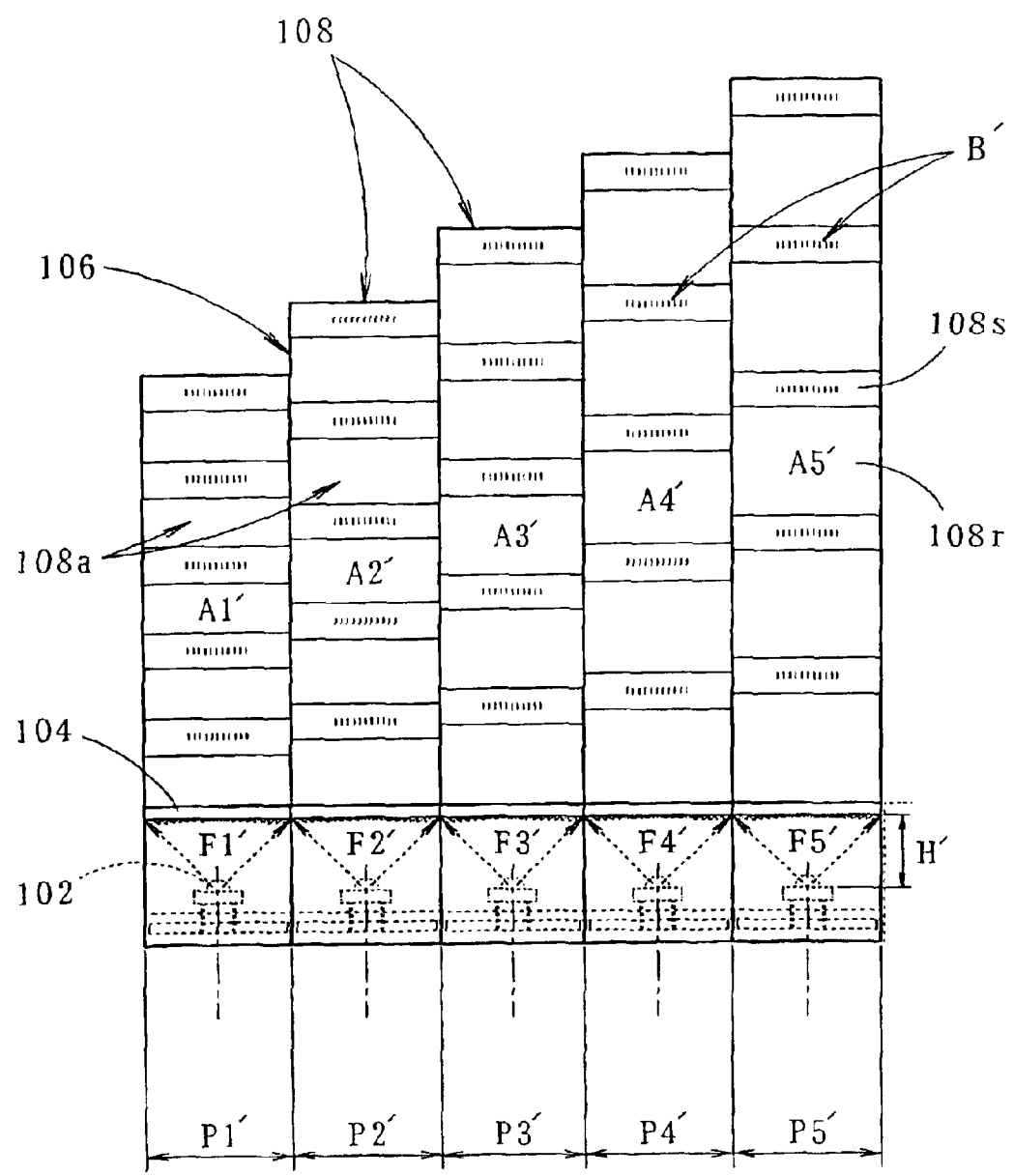
FIG. 10 is a view similar to FIG. 5 showing the conventional lamp of FIG. 9.

In the first-described embodiment, each of the reflecting surfaces 24a of the sub reflectors 24A to 24E constituting the reflector 18 is divided into five segments S whose vertical pitch increases stepwise from the leftmost sub reflector 24A to the rightmost sub reflector 24E. Alternatively, it is also possible, as shown in FIG. 8, for all the segments S into which the reflecting surfaces 24a of the sub reflectors 24A to 24E are made equal in height with the number of the segments S increasing stepwise from the leftmost sub reflector 24A to the rightmost sub reflector 24E.

In the case where such a construction is adopted, although the height of each of the reflecting elements 24s in any given one of the segments S decreases stepwise from the leftmost sub reflector 24A to the rightmost sub reflector 24E, the segments S are all equal in size when the lamp is viewed from the front. Thus, the first reflector 24 can be made to appear more uniform in brightness when the lamp 16 is lighted, and the appearance of the first reflector 24 can be improved as well when the lamp is not lighted.

Although the aforementioned embodiments relate to the case where the LED units 20A to 20E are laterally disposed, the same operational effects can be substantially achieved even if the LED units 20A to 20E are vertically disposed.

Moreover, although the aforementioned embodiments concern the case where the lamp unit 16 is intended for use as a tail-and-stop lamp, the same operational effects can be achieved if lamp unit is embodied for another purposes (e.g., a clearance lamp or the like).

It should further be apparent to those skilled in the art that various changes in form and detail of the invention as shown and described above may be made. It is intended that such changes be included within the spirit and scope of the claims appended hereto.

What is claimed is:

1. A vehicular lamp comprising:
   a plurality of LED light sources;
   a plurality of lenses for forming parallel light beams from light from corresponding ones of said LED light sources, said lenses being disposed such that said parallel light beams are directed in the same direction;
   a reflector for reflecting said parallel light beams from said lenses in a forward direction of said lamp, said reflector being divided into a plurality of sub reflectors arranged parallel to one another and according to areas on which the parallel light beams from said lenses impinge, a length of said sub reflectors with respect to a direction of radiation of said parallel light beams from said lenses decreasing stepwise from one side of said reflector to the opposite side of said reflector, an angle of inclination of each of said sub reflectors with respect to said forward direction of said lamp increasing in proportion to a decrease in length of the sub reflector in the direction of radiation of said parallel light beams with respect to an adjacent one of said sub reflector, and a distance between each of said LED light sources and the corresponding one of said lenses increasing stepwise in proportion to said decrease in length of the corresponding one of said sub reflectors in said direction of radiation of said parallel light beams; and
   a translucent cover disposed on a front side of said reflector.

2. The vehicular lamp according to claim 1, wherein widths of each of said sub reflectors and corresponding ones of said lenses in a direction perpendicular to a longitudinal direction of said lamp increase stepwise in proportion to said decrease in length of said sub reflector in said direction of radiation of said parallel light beams.

3. The vehicular lamp according to claim 1, wherein a reflecting surface of each of said sub reflectors is divided into a plurality of segments extending in the direction of radiation of said parallel light beams, each of said segments comprising a reflecting element and a step portion, whereby each of said sub reflectors is formed in a stepped configuration.

4. The vehicular lamp according to claim 3, wherein each of said reflecting elements comprises a curved surface that diffusively reflects parallel light in vertical and lateral directions.

5. The vehicular lamp according to claim 3, wherein each of said reflecting elements comprises a curved surface that diffusively reflects parallel light in one of vertical and lateral directions, and further comprising lensing formed on said translucent cover for diffusing said light in the other of said vertical and lateral directions.

6. The vehicular lamp according to claim 3, wherein each of said reflecting elements comprises a flat surface, and further comprising lensing formed on said translucent cover for diffusing said light in vertical and lateral directions.

7. The vehicular lamp according to claim 1, wherein said lenses increase stepwise in lateral width from said one side of said reflector to the opposite side of said reflector.

8. The vehicular lamp according to claim 7, wherein said lenses are equal in aperture angle.

9. The vehicular lamp according to claim 3, wherein each of said sub reflectors has the same number of said segments, a length of said step portions of said sub reflectors decreasing stepwise with respect to a direction of radiation of said parallel light beams from said lenses from said one side of said reflector to said opposite side of said reflector.

10. The vehicular lamp according to claim 3, wherein all of said segments of all of said sub reflectors are of an equal length, a number of said segments decreasing with respect to a direction of radiation of said parallel light beams from said lenses decreasing stepwise from said one side of said reflector to said opposite side of said reflector.

11. A vehicular lamp comprising:
    a plurality of LED light sources;
    a plurality of lenses for forming parallel light beams from light from corresponding ones of said LED light sources, said lenses being disposed such that said parallel light beams are directed in the same direction;
    a reflector for reflecting said parallel light beams from said lenses in a forward direction of said lamp, said reflector being divided into a plurality of sub reflectors arranged parallel to one another and according to areas on which the parallel light beams from said lenses impinge, a length of said sub reflectors with respect to a direction of radiation of said parallel light beams from said lenses decreasing stepwise from one side of said reflector to the opposite side of said reflector, an angle of inclination of each of said sub reflectors with respect to said forward direction of said lamp increasing stepwise from said one side of said reflector to said opposite side of said reflector, and a distance between each of said LED light sources and the corresponding one of said lenses increasing stepwise from said one side of said reflector to said opposite side of said reflector such that said reflector appears of substantially uniform brightness when viewed from a position in front of said lamp; and
    a translucent cover disposed on a front side of said reflector.

12. The vehicular lamp according to claim 11, wherein widths of each of said sub reflectors and corresponding ones of said lenses in a direction perpendicular to a longitudinal direction of said lamp increase stepwise in proportion to a decrease in length of said sub reflector in said direction of radiation of said parallel light beams.

13. The vehicular lamp according to claim 11, wherein a reflecting surface of each of said sub reflectors is divided into a plurality of segments extending in the direction of radiation of said parallel light beams, each of said segments comprising a reflecting element and a step portion, whereby each of said sub reflectors is formed in a stepped configuration.

14. The vehicular lamp according to claim 13, wherein each of said reflecting elements comprises a curved surface that diffusively reflects parallel light in vertical and lateral directions.

15. The vehicular lamp according to claim 13, wherein each of said reflecting elements comprises a curved surface that diffusively reflects parallel light in one of vertical and lateral directions, and further comprising lensing formed on said translucent cover for diffusing said light in the other of said vertical and lateral directions.

16. The vehicular lamp according to claim 13, wherein each of said reflecting elements comprises a flat surface, and further comprising lensing formed on said translucent cover for diffusing said light in vertical and lateral directions.

17. The vehicular lamp according to claim 13, wherein each of said sub reflectors has the same number of said segments, a length of said step portions of said sub reflectors decreasing stepwise with respect to a direction of radiation of said parallel light beams from said lenses from said one side of said reflector to said opposite side of said reflector.

18. The vehicular lamp according to claim 13, wherein all of said segments of all of said sub reflectors are of an equal length, a number of said segments decreasing with respect to a direction of radiation of said parallel light beams from said lenses decreasing stepwise from said one side of said reflector to said opposite side of said reflector.

* * * * *